United States Patent
Sasaoka et al.

(10) Patent No.: US 6,281,814 B1
(45) Date of Patent: Aug. 28, 2001

(54) DATA CONVERSION METHOD, DATA CONVERTER, AND PROGRAM STORAGE MEDIUM

(75) Inventors: Hideki Sasaoka; Hirohiko Kazato; Takashi Noma, all of Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 09/485,042

(22) PCT Filed: Jul. 31, 1998

(86) PCT No.: PCT/JP98/03425

§ 371 Date: Feb. 1, 2000

§ 102(e) Date: Feb. 1, 2000

(87) PCT Pub. No.: WO99/06921

PCT Pub. Date: Feb. 11, 1999

(30) Foreign Application Priority Data

Jul. 31, 1997 (JP) .................................................. 9-206775

(51) Int. Cl.[7] .................................................. H03M 7/00
(52) U.S. Cl. .............................. 341/50; 367/99; 702/191; 702/35
(58) Field of Search .................. 341/50, 155, 51, 341/54, 132; 128/660.07; 395/200.77; 364/725; 702/191, 35; 367/99

(56) References Cited

U.S. PATENT DOCUMENTS

| | | | |
|---|---|---|---|
| 5,619,998 | * 4/1997 | Abdel-Malek et al. | 128/660.07 |
| 5,802,369 | * 9/1998 | Ganesh et al. | 395/200.77 |
| 5,821,882 | * 10/1998 | Kazato et al. | 341/50 |

FOREIGN PATENT DOCUMENTS

| | | |
|---|---|---|
| 7-271763 | 10/1995 | (JP) . |
| 8-83265 | 3/1996 | (JP) . |
| 8-177530 | 7/1996 | (JP) . |
| 8-219955 | 8/1996 | (JP) . |
| 8-329046 | 12/1996 | (JP) . |

\* cited by examiner

*Primary Examiner*—Brian Young
*Assistant Examiner*—John Nguyen
(74) *Attorney, Agent, or Firm*—Blakely Sokoloff Taylor & Zafma

(57) ABSTRACT

A peak detecting section 121 detects the maximum values (peaks) of frequency distributions, at intervals of unit times, from the wavelet intensity signal output from an intensity computing section 113. More specifically, giving attention to frequency distributions of the wavelet intensity signal as the transform result obtained by a signal converting section 110 at predetermined time intervals, the peak detecting section 121 detects the peaks (maximum values) of the frequency intensity distributions at intervals of unit times (predetermined time intervals).

Changes in various frequency features over time which are contained in the time-series signal obtained by a wavelet transform of the time-series signal can be quantitatively grasped more accurately.

8 Claims, 9 Drawing Sheets

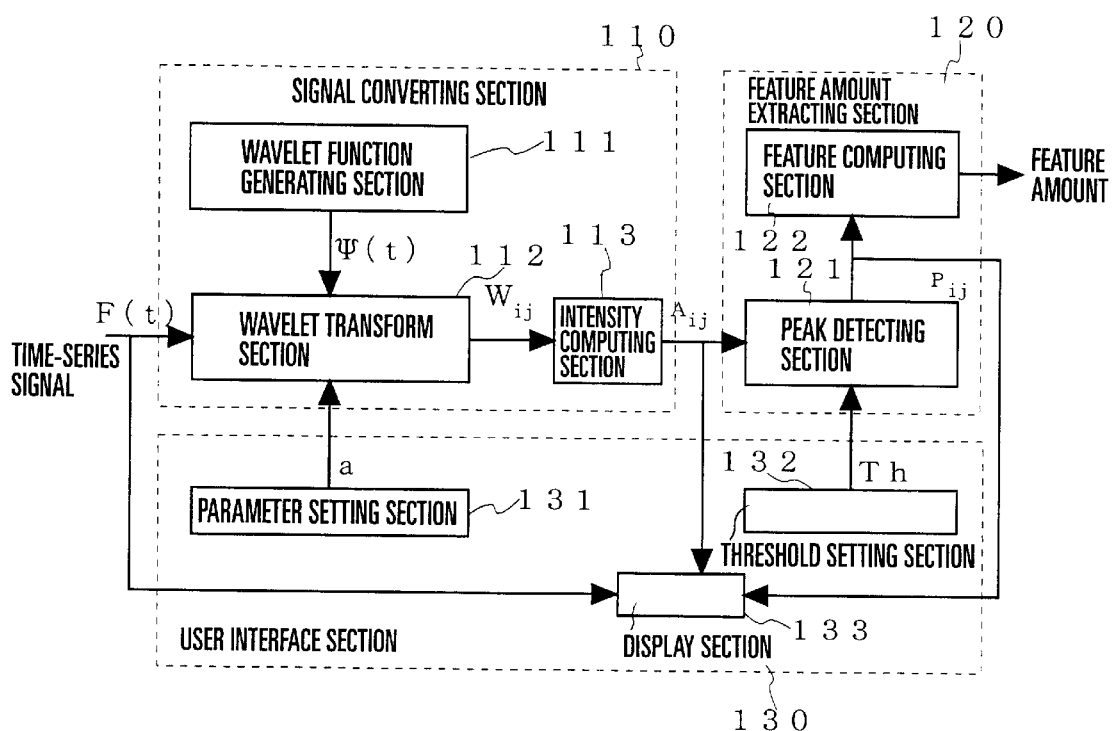
F I G. 1

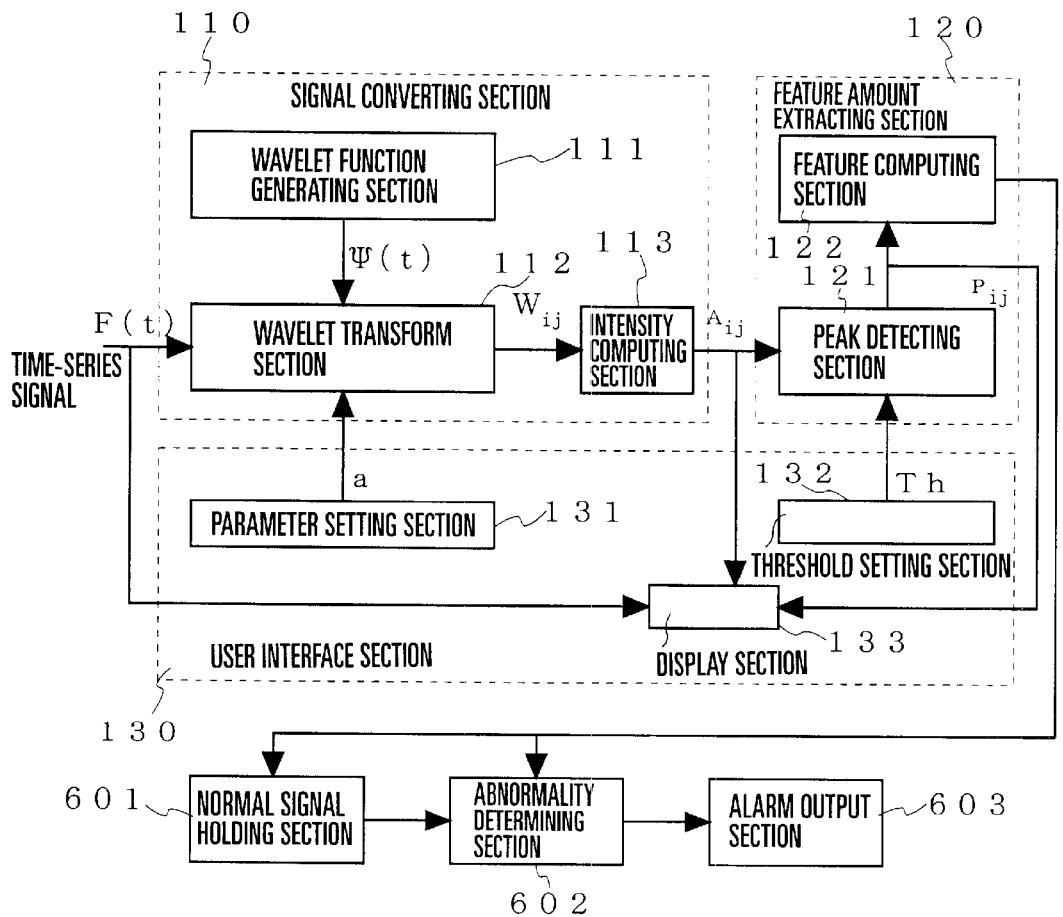
F I G. 6

DATA CONVERSION METHOD, DATA CONVERTER, AND PROGRAM STORAGE MEDIUM

TECHNICAL FIELD

The present invention relates to a data conversion method and apparatus which are used to extract characteristic portions from a time-series signal obtained for analysis, and a program storage medium.

BACKGROUND ART

When a wavelet transform is performed for a time-series signal representing vibrations, sounds, process data, or the like by using a complex type wavelet function, information about a time-frequency domain can be obtained. When intensities (absolute values) of this time-frequency domain information are computed, changes in various frequency characteristics contained in the time-series signal over time can be analyzed.

There is a technique (reference 1: Japanese Patent Laid-Open No. 7-271763) of differentiating time-frequency information as a wavelet transform result in units of scales, extracting extreme values as feature amounts, and using them for analysis and diagnosis.

There is a technique (reference Japanese 2: Patent Laid-Open No. 8-83265) of extracting feature amounts representing the periodicity of a signal, in units of scales, from time-frequency information as a wavelet transform result serving as a target signal and using them for analysis and diagnosis.

There is a technique (reference 3: Japanese Patent Laid-Open No. 8-219955) of computing statistical amounts such as averages and variances from a wavelet transform result serving as a target signal in units of scales, extracting them as features, and using them for diagnosis.

There is a technique (reference 4: Japanese Patent Laid-Open No. 8-177530) of comparing a wavelet transform result serving as a target signal with a predetermined threshold in units of scales, extracting values exceeding the threshold as features, and using them for diagnosis.

There is a technique (reference 5: Japanese Patent Laid-Open No. 8-329046) of computing variances in units of scales from a wavelet transform result serving as a target signal, extracting the peaks of the obtained variance distributions as features, and using them for analysis.

DISCLOSURE OF INVENTION

[Problem to be Solved by the Invention]

In the conventional methods of extracting feature amounts from a time-series signal which appear in a wavelet transform result, a person visually determines feature amounts or detects them by using a threshold (reference 4). According to these methods, however, it is difficult to discriminate such feature amounts from unnecessary feature amounts. In some case, therefore, desired feature amounts cannot be extracted.

When extreme values are extracted as feature amounts in units of scales from a wavelet transform result (reference 1), desired features may not be extracted.

If the feature that can be obtained from a wavelet transform result is limited to periodicity (reference 2), other useful features cannot be extracted.

If a statistical amount is used as a feature (references 3 and 5), an overall given domain having a temporal width is expressed by one feature amount. Hence, a detailed feature per unit time cannot be extracted.

Assume that vibration components are to be extracted from the time-series signal shown in FIG. 10. In this case, if a wavelet transform of the time-series signal is performed by using a complex type wavelet function to compute the intensity of the signal, the intensity signal shown in FIG. 11 can be obtained. FIG. 11 shows the wavelet intensity signal obtained by expressing the intensity of each signal component with luminance such that portions having higher intensities become brighter, and portions having lower intensities become darker. With a wavelet intensity signal like the one shown in FIG. 11, a stepped waveform and vibration waveform can be analyzed at the two axes, i.e., the frequency axis (ordinate) and time axis (abscissa).

Even if, a signal (data) is converted in this manner, it is not always easy to perform quantitative discrimination because of a large information amount as compared with the original signal, limitations in terms of resolution, and the like.

According to the technique in reference 4, if values exceeding a predetermined threshold are extracted as features from the wavelet intensity signal in FIG. 11, the extraction result shown in FIG. 12 can be obtained. With this technique, however, vibration components are difficult to extract.

More specifically, the method of setting a threshold, which is disclosed in reference 4, is effective when it is found that only desired features exceed the threshold with fail. However, such a case is likely to occur less frequently. If desired features do not exceed the threshold or other features exceed the threshold owing to various factors, it is difficult to perform discrimination. In addition, it is difficult to set a threshold itself. As described above, according to the result shown in FIG. 12 which is extracted with a threshold, the step portion of the original time-series signal cannot be satisfactorily discriminated from the vibration portion.

According to the technique disclosed in reference 2, peaks (extreme values) of changes over time are detected in units of scales from a wavelet transform result. If peaks periodically appear, the distances between the peaks are extracted as the periodicity of the original signal. According to the technique in reference 2, the extraction result shown in FIG. 13 can be obtained from the wavelet intensity signal shown in FIG. 11.

According to the extraction result in FIG. 13, however, no vibration component is extracted. That is, the technique in reference 2 cannot extract vibration components.

According to the technique in reference 1, a wavelet transform result serving as a target signal is differentiated in units of scales to extract the extreme values of changes over time as feature amounts in units of scales. Since extreme values include maximum and minimum values, according to the technique in reference 1, minimum values are extracted in units of scales from the wavelet intensity signal in FIG. 11, in addition to the maximum values extracted in units of scales as shown in FIG. 13.

Since the minimum values extracted from the wavelet intensity signal in FIG. 11 in units of scales are present in the dark portions in FIG. 11, i.e., the portions with low intensities, the extracted features include meaningless features. This makes it difficult to extract vibration components.

As disclosed in references 3 and 5, when a statistical amount is extracted as a feature, the features of a domain having a temporal width are expressed by a typical value termed a statistical amount. As a consequence, the temporal feature of the domain is lost. For example, according to the technique in reference 5, variance values are extracted as feature amounts in units of scales from a wavelet transform result. In this technique in reference 5, the result shown in FIG. 14 can be obtained from the wavelet intensity signal shown in FIG. 11. According to the result shown in FIG. 14, although the scale of vibration components, i.e., the frequency, can be specified, temporal information is lost. For this reason, information about the occurrence time, duration, and the like of vibration components cannot be obtained.

As described above, according to the conventional techniques, step components cannot be discriminated from vibration components, or temporal information is lost, in particular, although the existence of vibration components can be checked, because the feature amount of vibration components can be extracted only partly. For this reason, features cannot be quantitatively grasped.

The present invention has been made to solve the above problems, and has as its object to quantitatively grasp changes in various frequency features, with higher precision, which are contained in a time-series signal and obtained by performing a wavelet transform of the time-series signal.

[Means of Solution to the Problem]

The present invention has been made to solve such problems. According to the first method of the present invention, first of all, a time-series signal is converted into a first distribution representing a relationship between a time and a frequency by performing a wavelet transform of the time-series signal on the basis of a wavelet function, the first distribution is then converted into a second distribution representing a relationship between the time, the frequency, and an intensity thereof, and a peak of a frequency intensity distribution is detected per unit time in the second distribution.

As described above, since the peaks of frequency intensity distributions are detected in the second distribution at time intervals, characteristic frequency components having high intensities are extracted from the second distribution over time.

The first apparatus of the present invention comprises input means for inputting a time-series signal, a wavelet transform section for converting the time-series signal input by the input means into a first distribution representing a relationship between a time and a frequency by performing a wavelet transform for the time-series signal on the basis of a set wavelet function, an intensity computing section for converting the first distribution into a second distribution representing a relationship between the time, the frequency, and an intensity thereof, and a peak detecting section for detecting a peak of a frequency intensity distribution per unit time in the second distribution.

Since the peak detecting section detects the peaks of frequency intensity distributions in the second distribution at time intervals, characteristic frequency components having high intensities can be extracted from the second distribution over time.

In addition, the first program storage medium of the present invention stores a program comprising the first step of converting a time-series signal into a first distribution representing a relationship between a time and a frequency by performing a wavelet transform of the time-series signal on the basis of a wavelet function, the second step of converting the first distribution into a second distribution representing a relationship between the time, the frequency, and an intensity thereof, and the third step of detecting a peak of a frequency intensity distribution per unit time in the second distribution.

Since the peaks of frequency intensity distributions in the second distribution are detected at time intervals in the third step, characteristic frequency components having high intensities in the second distribution can be extracted over time.

[Effect]

According to the present invention, the following effect can be obtained owing to the arrangements defined in claims.

(1) Since the peaks of frequency intensity distributions in the second distribution are detected at time intervals, characteristic frequency components having high intensities can be extracted from the second distribution over time. As a consequence, changes in various frequency features over time which are contained in the time-series signal obtained by a wavelet transform of the time-series signal can be quantitatively grasped more accurately.

BRIEF DESCRIPTION OF DRAWINGS

FIG. 1 is a view showing the arrangement of a data conversion apparatus according to the first embodiment of the present invention;

FIG. 6 is a view showing the arrangement of a data conversion apparatus according to the third embodiment of the present invention;

BEST MODE OF CARRYING OUT THE INVENTION

Figure 2:
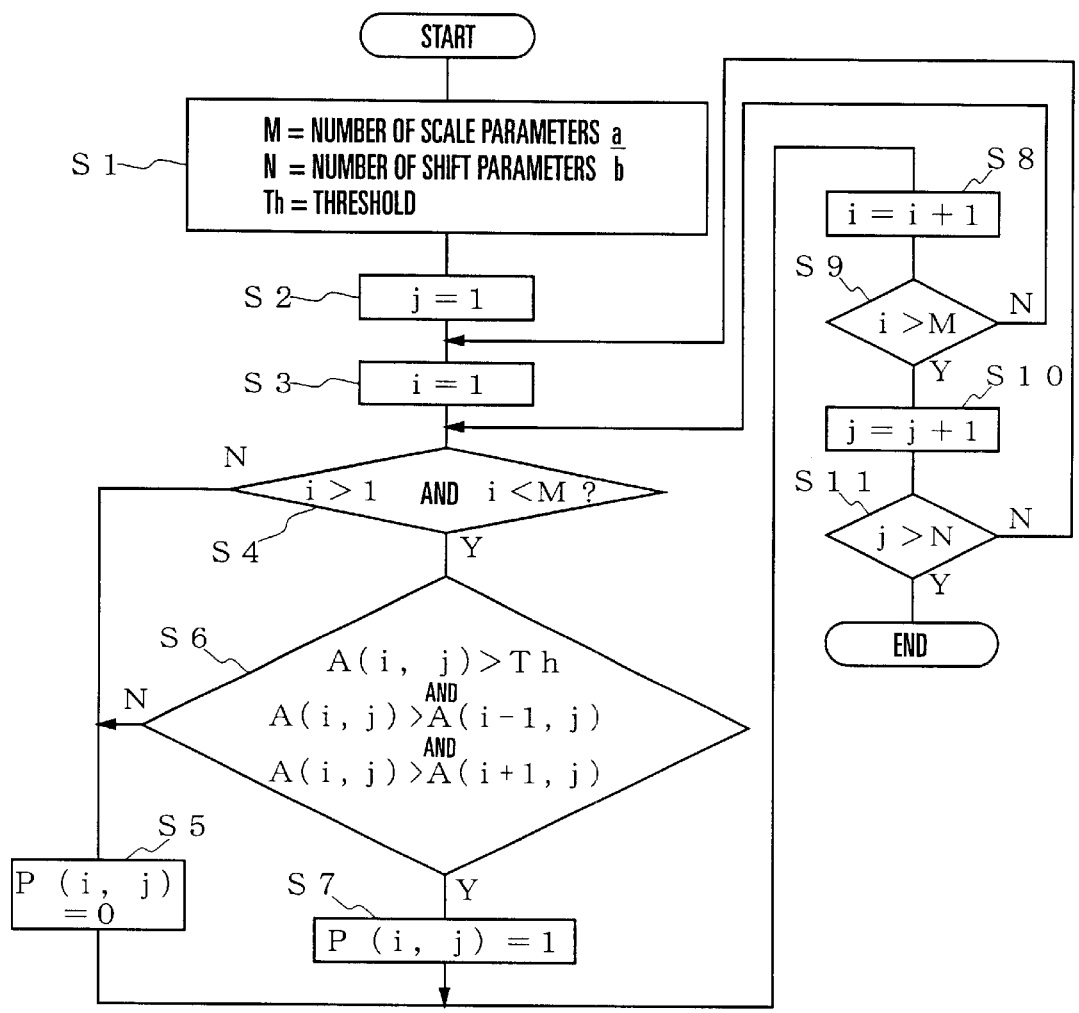
FIG. 2 is a flow chart showing the operation of a peak detecting section 121 in FIG. 1.

The embodiments of the present invention will be described below with reference to the accompanying drawings.

First Embodiment

The first embodiment of the present invention will be described first. FIG. 1 is a view showing the arrangement of a data conversion apparatus according to the first embodiment.

As shown in FIG. 1, this data conversion apparatus is comprised of a signal converting section 110, a feature amount extracting section 120 for extracting a feature from the signal output from the signal converting section 110, and a user interface section 130 for, for example, setting a parameter for the signal converting section 110 and setting a threshold for the feature amount extracting section 120.

The signal converting section 110 will be described in detail first. The signal converting section 110 is comprised of a wavelet function generating section 111, wavelet transform section 112, and intensity computing section 113.

The wavelet function generating section 111 generates a complex type wavelet serving as a basic function for a wavelet transform. As a typical complex type wavelet transform, a Gabor wavelet function is available. In this case, as a wavelet function Ψ(t), the Gabor wavelet function defined by equation (1) below is used.

$$\Psi(t) = e^{-\frac{t^2}{2}} \left( e^{i\Omega t} - e^{-\frac{\Omega^2}{e^2}} \right), \Omega = 2\pi \quad (1)$$

The wavelet transform section 112 performs a wavelet transform of the time-series signal input by an input means or the like (not shown) by using the complex type wavelet function generated by the wavelet function generating section 111.

More specifically, the wavelet transform section 112 performs a wavelet transform of the input time-series signal by using the complex type wavelet function generated by the wavelet function generating section 111 on the basis of a scale parameter corresponding to the frequency set by the user interface section 130. In this case, nonorthogonal wavelet transform is performed.

As the wavelet transform result, a wavelet transform signal W(a, b) developed in a time-frequency domain expressed by a complex number is obtained.

In this case, a defining expression and conditions for the wavelet transform are expressed by equations (2) below:

$$W(a, b) = \frac{1}{\sqrt{|a|}} \int_{-\infty}^{\infty} f(t) \Psi * \left[ \frac{t-b}{a} \right] dt \quad (2)$$

$$\int_{-\infty}^{\infty} \Psi(t) dt = 0$$

In this embodiment, letting M be the number of scale parameters a and N be the number of shift parameters b (equal to the number of time-series signal points), the wavelet transform signal W(a, b) is computed as two-dimensional array Wij having a size of M×N, as follows:

$$W_{ij} = (a_i, b_j) \; i=1, 2, \ldots, M, \; j=1, 2, \ldots, N$$

The intensity computing section 113 computes a wavelet intensity from the wavelet transform signal as the wavelet transform result. More specifically, the intensity computing section 113 computes a wavelet intensity signal $A_{ij}$ from the wavelet transform signal $W_{ij}$ as the wavelet transform result according to $A_{ij}=|W_{ij}|$. In this case, as the wavelet intensity signal, the absolute value of the wavelet transform signal is used.

The feature amount extracting section 120 will be described in detail next. The feature amount extracting section 120 is comprised of a peak detecting section 121 and feature computing section 122.

The peak detecting section 121 detects the maximum value (peak) of a frequency distribution for every unit time in accordance with the wavelet intensity signal output from the intensity computing section 113.

More specifically, giving attention to frequency distributions of the wavelet intensity signals as the transform results obtained by the signal converting section 110 at predetermined time intervals, the peak detecting section 121 detects the peaks (maximum values) of the frequency intensity distributions at intervals of unit times (predetermined time intervals).

In this peak detection, as shown in the flow chart of FIG. 2, first of all, the number of scale parameters a is set to a maximum value M of i in step S1. That is, the number of divisions of the frequency axis (scale) of the time-frequency information obtained by the wavelet transform is set. Likewise, the number of shift parameters b is set to a maximum value N of j. That is, the number of divisions of the time axis (shift) of the time-frequency information obtained by the wavelet transform is set. A threshold is set to Th. This threshold is set by the user interface section 130 to prevent detection of a negligibly small peak that can be produced by a computation error or the like.

In step S2, j is set to 1. In step S3, i is set to 1.

In step S4, it is checked whether i is larger than 1 and smaller than M. It is assumed that in the time-frequency information obtained as a result of the wavelet transform, no intensity peak appears at the minimum and maximum values of scale (frequency). This determination processing is performed to omit the above case.

If it is determined in this determination processing that i is 1 or M, the flow advances to step S5 to set P(i, j)=0. That is, the corresponding intensity is not a peak. If it is determined that i is 1 and is not M, the flow advances to step S6.

In step S6, it is checked whether an intensity A(i, j) at the frequency at a given time is higher than a preset threshold Th. In addition, it is checked whether the intensity A(i, j) is higher than an intensity A(i−1, j). Furthermore, it is checked whether the intensity A(i, j) is higher than an intensity A(i+1, j).

If it is determined that A(i, j)>Th, A(i, j)>A(i−1, j), and A(i, j)>A(i+1, j), it is determined that the intensity A at the frequency (i) is the peak at this time (j). The flow then advances to step S7 to set P(i, j)=1.

If A(i, j)>Th, A(i, j)>A(i−1, j), and A(i, j)>A(i+1, j) are not satisfied, it is determined that the intensity A at the frequency (i) does not indicate a peak at the time (j). The flow then advances to step S5 to set P(i, j)=0.

In step S8, 1 is added to i. In step S9, it is checked whether i is larger than M. If it is determined in step S9 that i is not larger than M, steps S4 to S8 are repeated. If it is determined in step S9 that i is larger than M, the flow advances to step S10 to add 1 to j. In step S11, it is checked whether j is larger than N. If it is determined in step S11 that j is not larger than N, steps S3 to S10 are repeated. If it is determined in step S11 that j is larger than N, the processing is terminated.

With the above processing, at every point in the frequency distribution of the wavelet intensity signal $A_{ij}$ per unit time, a peak intensity is represented by 1 and an intensity that is not a peak is represented by 0, thereby detecting a peak as a binary value and obtaining a frequency distribution peak signal $P_{ij}$.

The feature computing section 122 then computes feature amounts such as a frequency, occurrence time, and duration from the detected frequency distribution peak signal for each unit time.

The user interface section 130 is comprised of a parameter setting section 131, threshold setting section 132, and display section 133. As described above, the parameter setting section 131 sets a scale parameter for the wavelet transform section 112 in correspondence with a frequency. The threshold setting section 132 sets a threshold used by the peak detecting section 121 to prevent detection of a negligibly small peak that is produced due to a computation error or the like.

The display section 133 displays the wavelet intensity signal output from the signal converting section 110, the frequency distribution peak signal obtained by the feature amount extracting section 120, and the like.

Figure 3A:
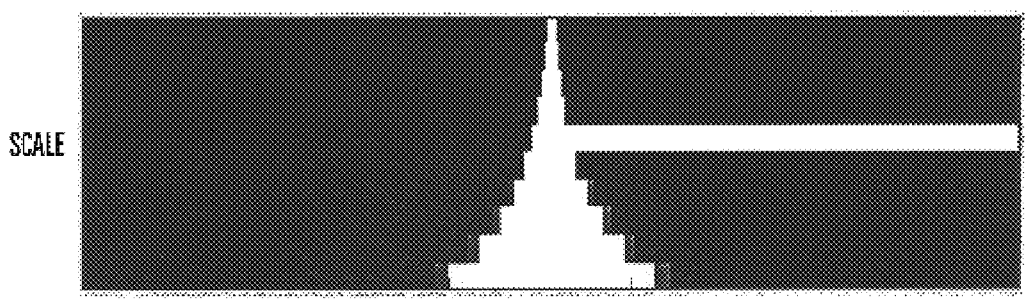
FIG. 3 is a view showing distributions indicating the output results of a wavelet intensity signal and frequency distribution peak signal.
Figure 3B:
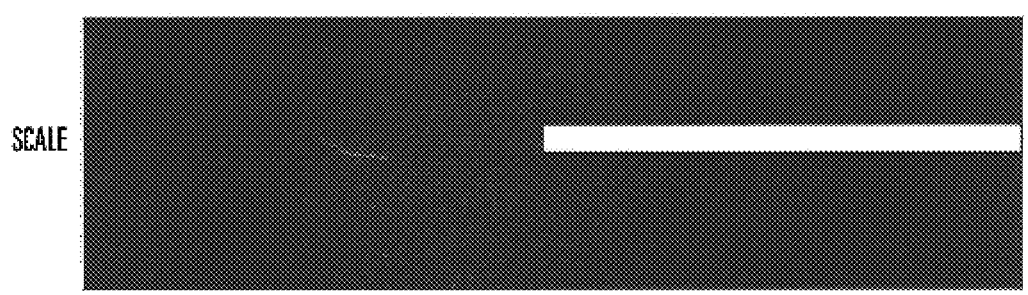

FIG. 3 shows distribution charts indicating the output results of the wavelet intensity signal and frequency distribution peak signal displayed on the display section 133. FIG. 3(a) shows the wavelet intensity signal obtained as a result of the wavelet transform. FIG. 3(b) shows the frequency distribution peak signal. In each of these distribution charts, the abscissa represents the time; and the ordinate (scale), the frequency.

Figure 10:
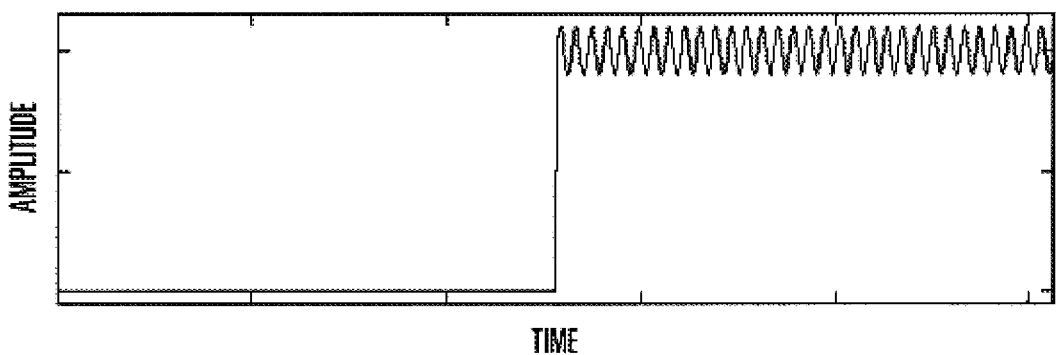
FIG. 10 is a view showing the waveform of a time-series signal.
Figure 11:
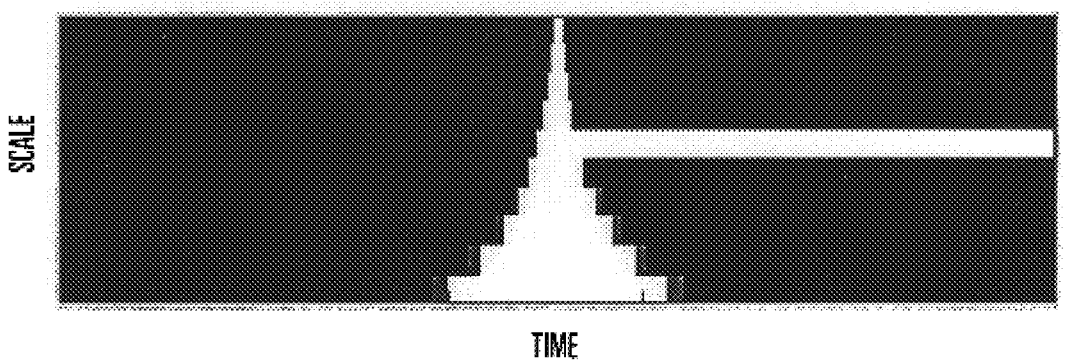
FIG. 11 is a view showing a distribution indicating the wavelet intensity signal obtained by performing a wavelet transform of the time-series signal in FIG. 10.
Figure 12:
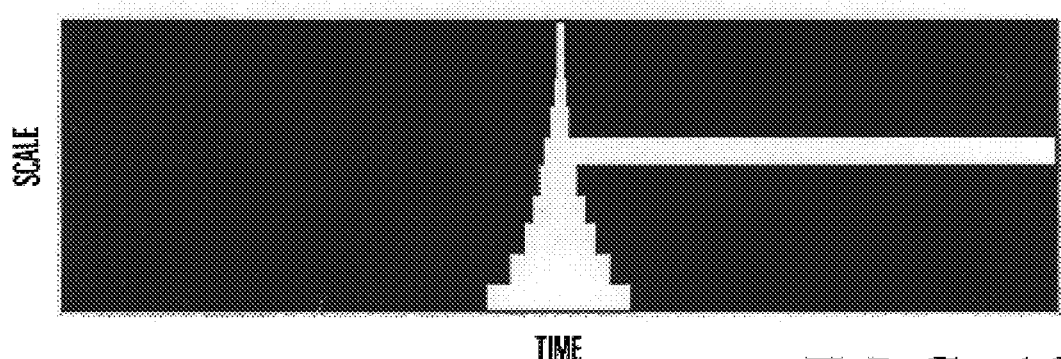
FIG. 12 is a view showing the distribution obtained by performing predetermined processing for the wavelet intensity signal in FIG. 11.
Figure 13:
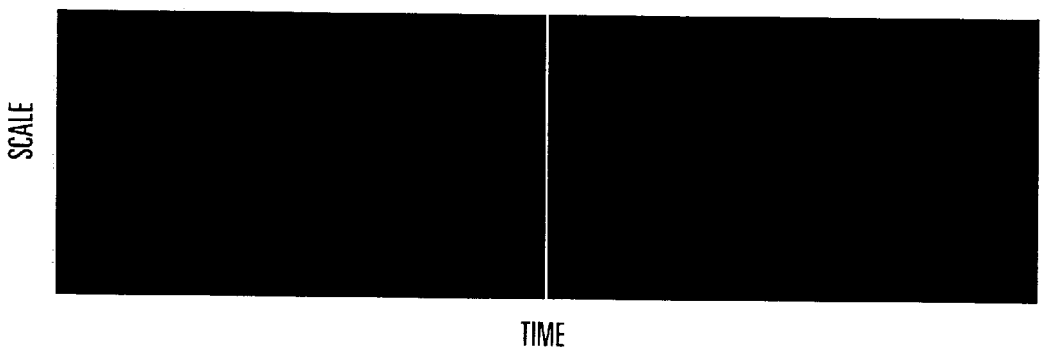
FIG. 13 is a view showing the distribution obtained by performing predetermined processing for the wavelet intensity signal in FIG. 11.
Figure 14:
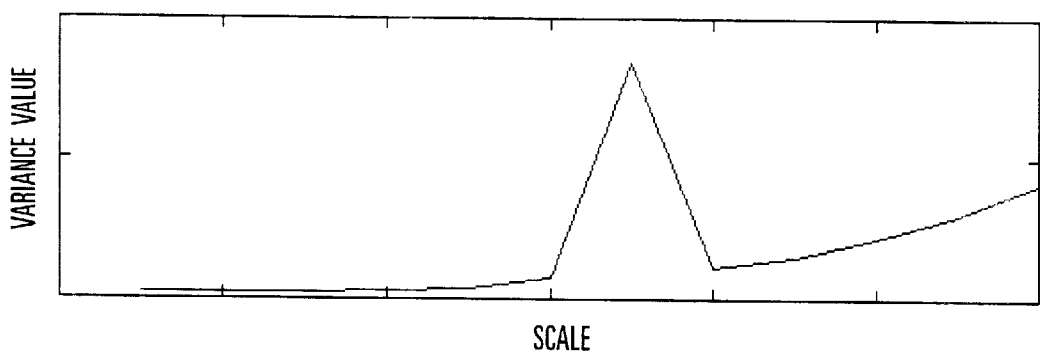
FIG. 14 is a view showing the distribution obtained by performing predetermined processing for the wavelet intensity signal in FIG. 11.

These results are obtained from the time-series signal in FIG. 10 by the data conversion apparatus according to the first embodiment of the present invention described above. As is obvious from FIG. 3(b), only characteristic vibration components are extracted from the time-series signal in FIG. 10.

Second Embodiment

The second embodiment of the present invention will be described below. In the second embodiment, as shown in FIG. 4, the above data conversion apparatus is applied to abnormality control detection in an air-conditioner.

Figure 4:
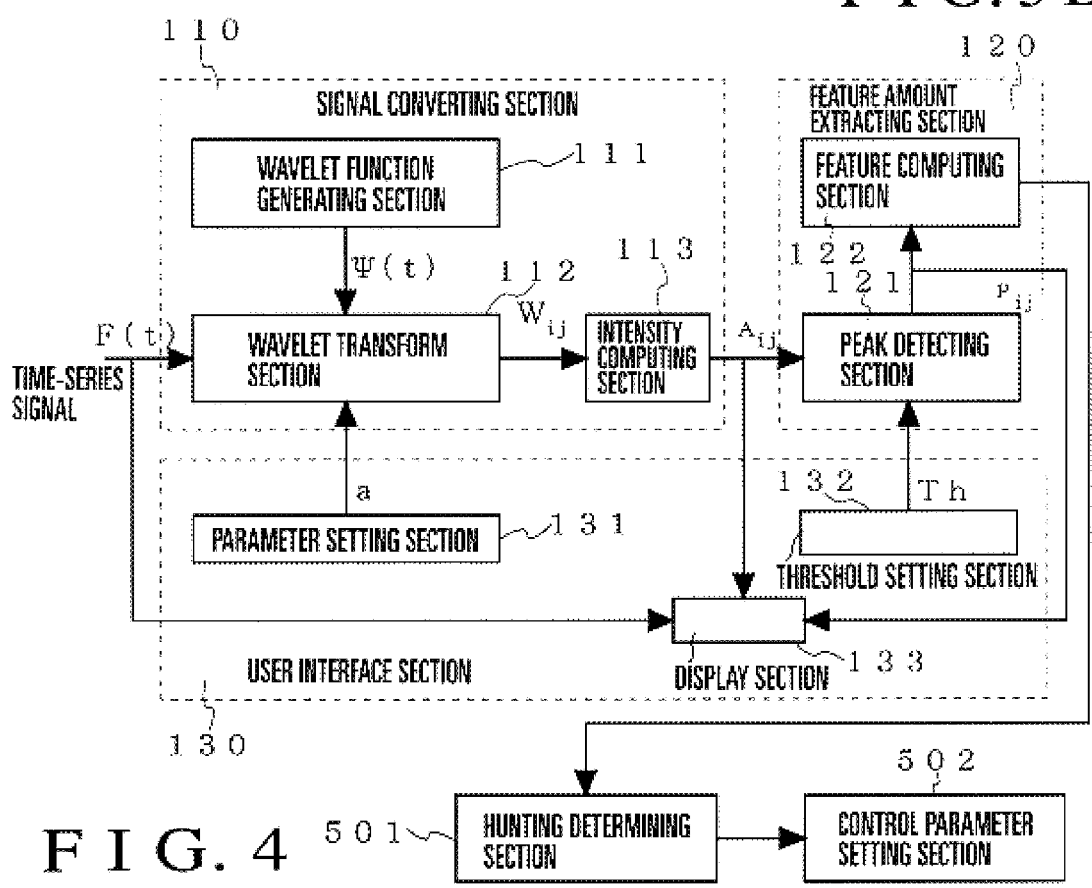
FIG. 4 is a view showing the arrangement of a data conversion apparatus according to the second embodiment of the present invention.

As shown in FIG. 4, the second embodiment additionally has a hunting determining section 401 and control parameter setting section 402.

More specifically, the data conversion apparatus of the second embodiment is comprised of the hunting determining section 401 and control parameter setting section 402, in addition to a signal converting section 110, a feature amount extracting section 120 for extracting a feature from the signal output from the signal converting section 110, a user interface section 130 for setting a parameter for the signal converting section 110 and a threshold for the feature amount extracting section 120.

The signal converting section 110 is comprised of the wavelet function generating section 111, wavelet transform section 112, and intensity computing section 113. The feature amount extracting section 120 is comprised of a peak detecting section 121 and feature computing section 122. The user interface section 130 is comprised of a parameter setting section 131, threshold setting section 132, and display section 133.

In an air-conditioner installed in a building or the like, a control parameter set at the time of installation may become an improper value due to a change in the performance of the air-conditioner over time. As a result, control of the air-conditioner becomes unstable, and inconveniences such as hunting, i.e., variations in temperature in the temperature-controlled room in short cycles, occur.

This hunting reflects the operation state of the air-conditioner. The occurrence of hunting will waste energy or make the user uncomfortable.

Since this hunting appears as vibration components at relatively short intervals, the occurrence of hunting may be missed by a conventional method in which a person monitors an air-conditioned state. In addition, if there are a plurality of devices, all the devices cannot be monitored.

Figure 5A:
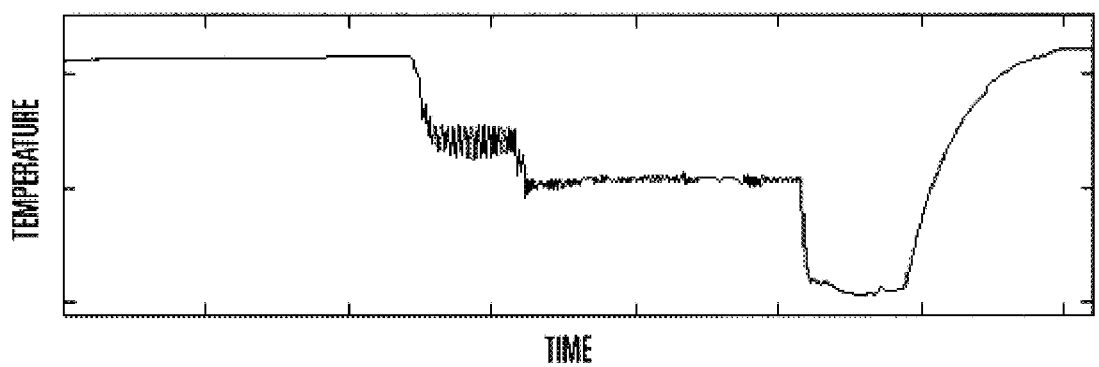
FIG. 5 is a view showing a temperature detection result (a) in a temperature-controlled room, the wavelet intensity signal distribution (b) obtained by performing a wavelet transform of the temperature detection result, and the result (c) extracted by a feature amount extracting section 120 from the wavelet transform result.
Figure 5B:
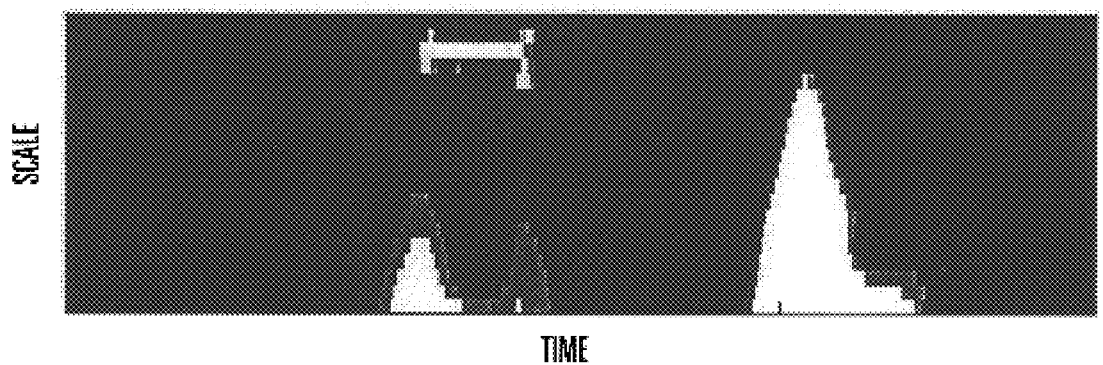
Figure 5C:
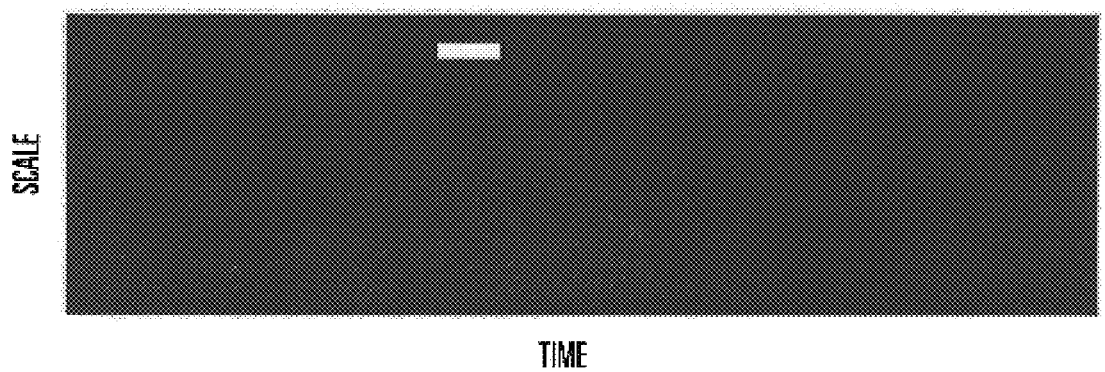

FIG. 5 shows a temperature detection result (a) in an air-conditioned room, a wavelet intensity distribution (b) obtained by performing a wavelet transform of the result, and a result (c) obtained by extracted from the wavelet transform result using the feature amount extracting section 120. Referring to FIGS. 5(b) and 5(c), the abscissa represents the time; and the ordinate (scale), the frequency.

As shown in FIG. 5(a), the above hunting occurs in a given time zone. In the temperature detection result, the hunting appears as vibration components. For this reason, as shown in FIG. 5(c), only the vibration components can be extracted in the same manner as in the first embodiment described above.

The operation of the data conversion apparatus according to the second embodiment will be described. The hunting determining section 401 determines the state of hunting indicated by the extracted feature amount on the basis of the frequency, occurrence time, duration, amplitude, and the like. The control parameter setting section 402 computes an optimal air-conditioner control value suited to each device in air-conditioning equipment or an environment for an air-conditioning target, and sets the control value in the air-conditioner.

As described above, in the second embodiment, only vibration components appearing as air-conditioning data hunting can be automatically detected. Therefore, this embodiment can perform hunting detection for each of a plurality of devices without missing this state. This makes it possible to solve the problem of hunting.

Third Embodiment

The third embodiment of the present invention will be described below. In the third embodiment, as shown in FIG. 6, the above data conversion apparatus is applied to abnormality diagnosis of a rotating device.

As shown in FIG. 6, the third embodiment additionally has a normal signal holding section 601, abnormality determining section 602, and alarm output section 603.

More specifically, the data conversion apparatus of the third embodiment has the normal signal holding section 601, abnormality determining section 602, and alarm output section 603, in addition to a signal converting section 110, a feature amount extracting section 120 for extracting a feature from the signal output from the signal converting section 110, and a user interface section 130 for setting a parameter for the signal converting section 110 and a threshold for the feature amount extracting section 120.

The signal converting section 110 is comprised of a wavelet function generating section 111, wavelet transform section 112, and intensity computing section 113. The feature amount extracting section 120 is comprised of a feature amount extracting section 120, peak detecting section 121, and feature computing section 122. The user interface section 130 is comprised of a parameter setting section 131, threshold setting section 132, and display section 133.

When a foreign substance enters a rotating member such as a bearing of a rotating device or the rotating member deteriorates, the rotating member is damaged. If this member is left as it is, a failure occurs during operation, resulting in serial damage. Such a damage must therefore be detected at an early stage and repaired.

Figure 7A:
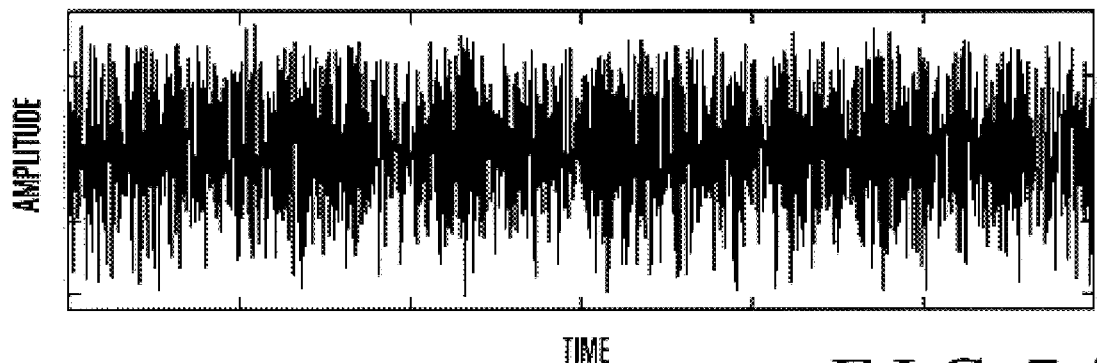
FIG. 7 is a view showing the vibration waveform (a) of a rotating member during normal operation of a rotating device, the wavelet intensity signal distribution (b) obtained by performing a wavelet transform of the vibration waveform, and the result (c) extracted by a feature amount extracting section 120 from the wavelet transform result.
Figure 7B:
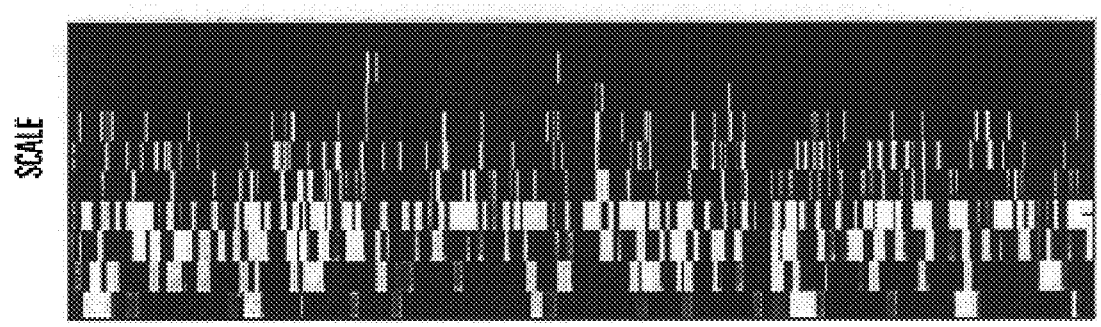
Figure 7C:
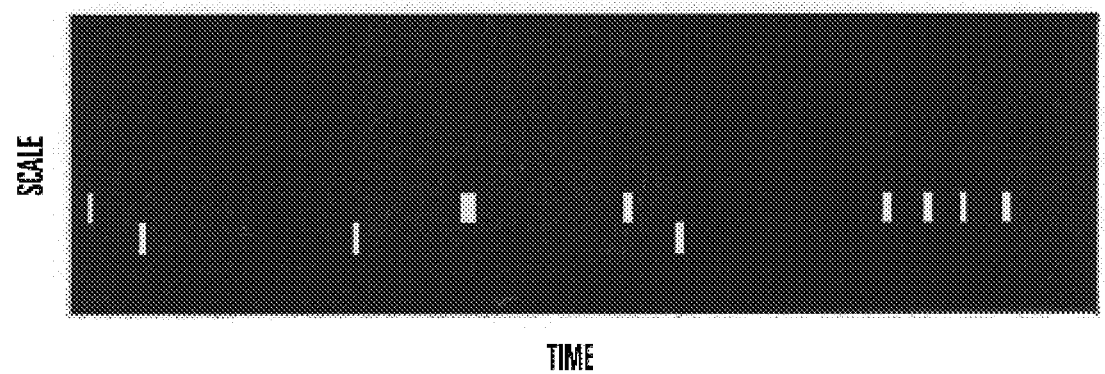
Figure 8A:
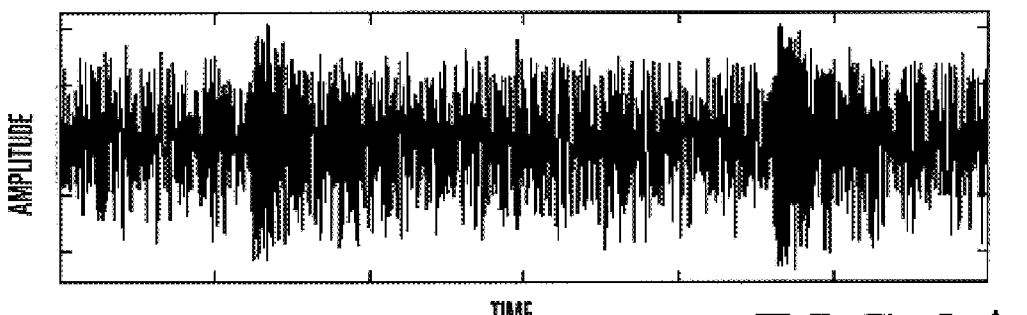
FIG. 8 is a view showing the vibration waveform (a) of a rotating member during abnormal operation of a rotating device, the wavelet intensity signal distribution (b) obtained by performing a wavelet transform of the vibration waveform, and the result (c) extracted by a feature amount extracting section 120 from the wavelet transform result.
Figure 8B:
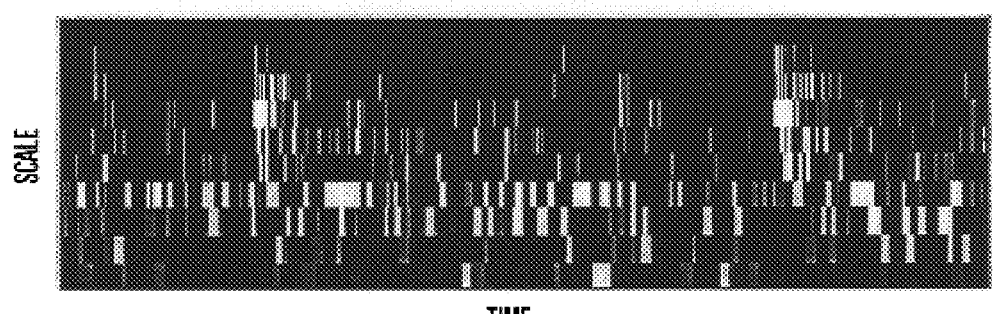

FIG. 7 shows the vibration waveform (a) of the rotating member during normal operation of the rotating device, the wavelet intensity signal (b), and the result (c) extracted by the feature amount extracting section 120 from the wavelet transform result. In this case, for example, the sound generated by the bearing portion is detected. FIG. 8 shows the vibration waveform (a) of the rotating member at the time of occurrence of abnormality in the rotating device, the wavelet intensity signal (b), and the result (c) extracted by the feature amount extracting section 120 from the wavelet transform result.

If, for example, abnormal vibrations are produced by damage or the like caused when a foreign substance enters the bearing of the rotating device, high-frequency components intermittently appear. The occurrence of such components can be roughly discriminated by visually comparing FIG. 7(a) with FIG. 8(a).

If, however, the damage appearing as such intermittent high-frequency components is small, the rotating device does not completely fail/stop. In a situation in which the rotating device does not fail, the intermittent high-frequency components are very small. It is almost impossible to simply discriminate such components from a wavelet intensity signal so as to automatically detect the components because of the influences of noise and the like. Intermittent high-frequency components cannot be automatically extracted even by comparing FIG. 7(b) with FIG. 8(b).

Figure 8C:

As described above, as shown in FIGS. 7(c) and 8(c), by extracting a frequency distribution peak signal, high-frequency components at the time of abnormality and the occurrence intervals of these components can be clearly detected. Referring to FIG. 8(c), high-frequency components intermittently appear, and hence a feature amount is extracted.

The feature amount in a normal state obtained by the feature amount extracting section 120 is stored in the normal signal holding section 601 in advance. The abnormality determining section 602 can determine abnormality by comparing the feature amount obtained at the time of occurrence of abnormality with the feature amount in the normal state.

If abnormality is determined as a result of this abnormality determination, the alarm output section 603 outputs an alarm to make it possible to repair the device before a failure. As described above, even if abnormality due to the damage caused in the bearing is small, the abnormality can be reliably detected before the abnormality leads to a failure/stop.

In the above description, this embodiment includes the signal converting section 110 and feature amount extracting section 120. The operations of these sections may be executed by a CPU.

Figure 9:
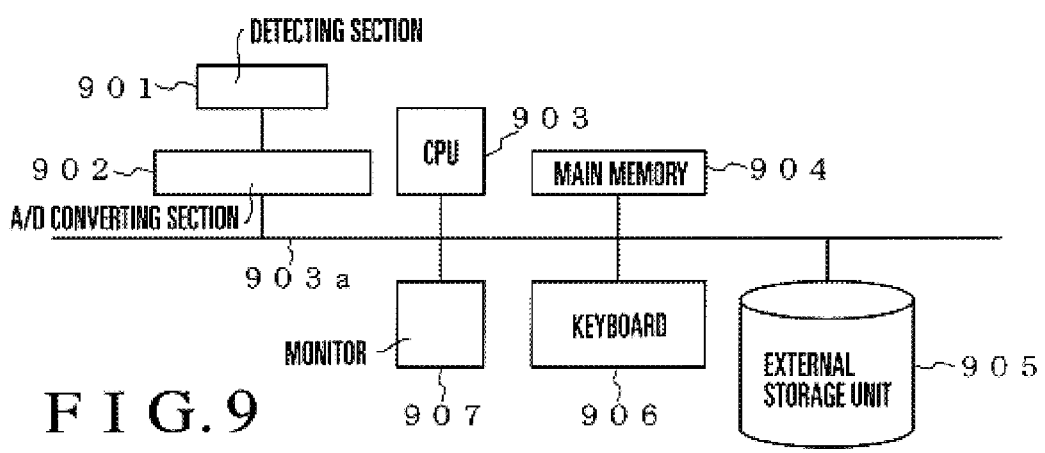
FIG. 9 is a view showing the arrangement of a data conversion apparatus according to another embodiment of the present invention.

More specifically, as shown in FIG. 9, first of all, an A/D converting section 902 converts the time-series signal obtained by a detecting section 901 into a digital signal. A CPU 903 performs a wavelet transform of this converted signal to form a wavelet transform signal developed in a time-frequency domain, computes the intensity of the signal, and detects the maximum value (peak) of a frequency distribution per unit time by using the output wavelet intensity signal.

The CPU 903 performs the above series of operations in accordance with the program developed in a main memory 904 connected to a bus 903a. In addition, the program developed in the main memory 904 is stored in an external storage unit 905. In addition, the wavelet function used for a wavelet transform may be stored in the external storage unit 905 in advance. In addition, a parameter and threshold may be set with a keyboard 906. An obtained frequency distribution peak signal or the like is displayed on a monitor 907.

In the above embodiment, wavelet transform is performed by using the complex type wavelet transform (Gabor wavelet function) represented by equations (2). However, the present invention is not limited to this.

In general, wavelet transforms can be roughly classified into orthogonal wavelet transforms and nonorthogonal wavelet transforms. As the wavelet transform used in the above embodiment, a nonorthogonal, complex type wavelet function is used.

A nonorthogonal wavelet transform may be performed by using either a complex type wavelet function as described above or a real number type wavelet function as will be described later.

If a complex type wavelet function such as a Gabor function or the like as described above is used for a nonorthogonal wavelet function, since an intensity can be obtained by computing the absolute value of the wavelet transform result, a peak can be directly detected from the intensity.

If a real number type wavelet function such as a Mexican hat function, French hat function, or Shannon function is used for a nonorthogonal wavelet transform, no intensity can be obtained by computing the absolute value of the wavelet transform function. If, however, envelope processing is performed for the computed absolute value by using a low-pass filter or the like, information corresponding to the intensity can be obtained. This makes it possible to perform peak detection.

For an orthogonal wavelet transform, only a real number type wavelet function is used. This wavelet function includes a Daubecies function, Harr function, Meyer function, Symlet function, spline function, Coiflet function, and the like.

In this orthogonal wavelet transform, if envelope processing is performed for a computed absolute value, information corresponding to the intensity can be obtained, thus enabling peak detection, as in the case of a nonorthogonal wavelet transform using a real number type wavelet transform.

In an orthogonal wavelet transform, however, if the frequency decreases, the number of data converted reduces, or the respective frequencies (scales) become inconsistent in time. For this reason, data interpolation or time adjustment may be required. A computation method that prevents a reduction in the number of data may be used for an orthogonal wavelet transform. This method makes it possible to obtain the same result as that obtained by a nonorthogonal wavelet transform using a real number type wavelet function.

According to the above description, characteristic high-frequency components are extracted. however,the present invention is not limited to this. characteristic low-frequency components that hide in high-frequency noise can be extracted by the present invention.

What is claimed is:

1. A data conversion method characterized by comprising:
the first step of converting a time-series signal into a first distribution representing a relationship between a time and a frequency by performing a wavelet transform of the time-series signal on the basis of a wavelet function;
the second step of converting the first distribution into a second distribution representing a relationship between the time, the frequency, and an intensity thereof; and
the third step of detecting a peak of a frequency intensity distribution per unit time in the second distribution.

2. A data conversion method according to claim 1, characterized in that the third step comprises extracting as a feature amount a peak of the peaks detected in the third step which is not lower than a desired threshold.

3. A data conversion method according to claim 1 or 2, characterized in that the wavelet transform is a nonorthogonal wavelet transform.

4. A data conversion method according to claim 3, characterized in that the wavelet function is of a complex type.

5. A data conversion apparatus characterized by comprising:

input means for inputting a time-series signal;

a wavelet transform section for converting the time-series signal input by said input means into a first distribution representing a relationship between a time and a frequency by performing a wavelet transform for the time-series signal on the basis of a set wavelet function;

an intensity computing section for converting the first distribution into a second distribution representing a relationship between the time, the frequency, and an intensity thereof; and a peak detecting section for detecting a peak of a frequency intensity distribution per unit time in the second distribution.

6. A data conversion apparatus according to claim 5, characterized by comprising a feature amount calculating section for extracting as a feature amount a peak of the peaks detected by said peak detecting section which is not lower than a desired threshold.

7. A program storage medium storing a program comprising:

the first step of converting a time-series signal into a first distribution representing a relationship between a time and a frequency by performing a wavelet transform of the time-series signal on the basis of a wavelet function;

the second step of converting the first distribution into a second distribution representing a relationship between the time, the frequency, and an intensity thereof; and the third step of detecting a peak of a frequency intensity distribution per unit time in the second distribution.

8. A program storage medium storing a program comprising:

the first step of converting a time-series signal into a first distribution representing a relationship between a time and a frequency by performing a wavelet transform of the time-series signal on the basis of a wavelet function;

the second step of converting the first distribution into a second distribution representing a relationship between the time, the frequency, and an intensity thereof;

the third step of detecting a peak of a frequency intensity distribution per unit time in the second distribution; and the fourth step of extracting as a feature amount a peak of the peaks detected in the third step which is not lower than a desired threshold.

* * * * *